United States Patent [19]
Makio et al.

[11] Patent Number: 5,412,502
[45] Date of Patent: May 2, 1995

[54] SECOND HARMONIC GENERATING ELEMENT AND THE PRODUCTION METHOD THEREOF

[75] Inventors: Satoshi Makio, Kumagaya; Fumio Nitanda, Fukaya; Yasuhiro Furukawa, Fukaya; Kohei Ito, Fukaya; Masazumi Sato, Fukaya; Kazutami Kawamoto, Kanagawa; Kenchi Ito, Kokubunji, all of Japan

[73] Assignees: Hitachi Metals, Ltd.; Hitachi Ltd., both of Tokyo, Japan

[21] Appl. No.: 8,310

[22] Filed: Jan. 25, 1993

[30] Foreign Application Priority Data

| Jan. 24, 1992 | [JP] | Japan | 4-34372 |
| Feb. 28, 1992 | [JP] | Japan | 4-078480 |
| Feb. 28, 1992 | [JP] | Japan | 4-078481 |
| Feb. 28, 1992 | [JP] | Japan | 4-078482 |
| Feb. 28, 1992 | [JP] | Japan | 4-078483 |
| May 8, 1992 | [JP] | Japan | 4-115749 |
| Jun. 2, 1992 | [JP] | Japan | 4-167021 |
| Jun. 18, 1992 | [JP] | Japan | 4-184473 |

[51] Int. Cl.$^6$ .............................. G02F 1/37
[52] U.S. Cl. ........................ 359/332; 359/328; 385/122
[58] Field of Search ............... 359/326–332; 385/122

[56] References Cited

U.S. PATENT DOCUMENTS

| 5,022,729 | 6/1991 | Tamada et al. | 359/328 |
| 5,036,220 | 7/1991 | Byer et al. | 359/328 |
| 5,052,770 | 10/1991 | Papuchon | 359/328 |
| 5,185,752 | 2/1993 | Welch et al. | 359/328 X |
| 5,249,191 | 9/1993 | Sawaki et al. | 359/328 X |
| 5,253,259 | 10/1993 | Yamamoto et al. | 359/332 X |
| 5,274,727 | 12/1993 | Ito et al. | 385/122 |

FOREIGN PATENT DOCUMENTS

| 0466191 | 1/1992 | European Pat. Off. | 359/328 |
| 3-164725 | 7/1991 | Japan | 359/328 |
| 4-335329 | 11/1992 | Japan | 359/328 |
| 4-340525 | 11/1992 | Japan | 359/328 |
| WO90/04807 | 5/1990 | WIPO. | |

OTHER PUBLICATIONS

Kiminori Mizuuchi, et al., *Second–Harmonic Generation of Blue Light in a LiTaO$_3$ Waveguide*, American Institute of Physics, Appl. Phys. Lett., vol. 58, No. 24, Jun. 17, 1991, pp. 2732–2734.

M. Yamada et al., *Fabrication of Periodically Reversed Domain Structure for SHG in LiNbO$_3$ by Direct Electron Beam Lithography at Room Temperature*, Electronics Letters, vol. 27, No. 10, May 9, 1991, pp. 828–829.

Kiminori Mizuuchi, et al., *Fabrication of First-Order Periodically Domain-Inverted Structure in LiTaO$_3$*, American Institute of Physics, Appl. Phys. Lett., vol. 59, No. 13, Sep. 23, 1991, pp. 1538–1540.

*Primary Examiner*—John D. Lee
*Attorney, Agent, or Firm*—Staas & Halsey

[57] ABSTRACT

Using an LiTaO$_3$ or LiNbO$_3$ substrate, a proton exchange layer in a grid pattern, namely sprout areas of polarization inversion, is firstly, formed on the surface of said substrate and, after formation of the pattern, heat treatment is executed at a temperature of 200° C. or more and for a holding time of 10 minutes or less. By maintaining the temperature gradient up to said heat treatment point at 50° C./min. or steeper and by maintaining the temperature decrease rate from said heat treatment point at 50° C./min. or faster, polarization inverted areas are formed downwards from the proton exchanged areas, while in addition to making the top ends of said polarization inverted areas into an acute angle, the depth/weight ratio of the polarization inverted grids being formed is made to exceed 1, thus enabling the production of a high-efficiency SHG element.

17 Claims, 13 Drawing Sheets

FIG. 11  2μm
FIG. 12  1μm

SECOND HARMONIC GENERATING ELEMENT AND THE PRODUCTION METHOD THEREOF

BACKGROUND OF THE INVENTION

1. Field of the Invention

This invention relates to a quasi-phase-matching-type second harmonic generating element (hereafter called SHG) using substrates of non-linear ferroelectric optical substances such as $LiTaO_3$ (hereafter called LT) and $LiNbO_3$ (hereafter called LN) and the production method thereof and also of enhancement of the output light and efficiency of the SHG element. 2. Related Art In recent years, the conversion of semiconductor laser of a wave length of 830 nm into a blue light of half that wave length, 415 nm by use of SHG elements has gained considerable attention as a compact, light weight blue light source.

Especially, those quasi-phase-matching-type SHG elements which feature polarization inversion grids formed with a period of 1–10 micron to match the wave length of the SHG light being generated, are regarded as promising elements for their easy phase matching and high SHG efficiency.

For example, pages 731–732 of the Electronics Letters, 25, 11 (1989), introduce a method as shown in FIG. 2 wherein periodic grids are produced on an LN substrate 21 by Ti diffusion and are heated up to about 1,100° C. to invert selectively the polarization of the periodic grid layers to form triangular polarization inverted areas 31 before producing a light wave guide 13 by means of the proton exchange method therein fundamental wave 14 is injected to obtain SHG light 15.

Also, when using LT substrates, for example, as described on pages 2,732–2,734 in the Appl. Phys. Lett. 58 (24) (1991), a method as shown in FIG. 3 is being tested wherein periodic grids are produced on a substrate 11 made of LT by proton exchange rather than Ti diffusion, said periodic grids being heated up to about 600° C. to invert selectively the polarization of the periodic grid layers to produce semi-circular polarization inverted areas 41 before producing a light wave guide 13 by means of the proton exchange method wherein fundamental wave 14 is injected to obtain SHG light 15.

Furthermore, a method to form the polarization inverted areas by means of the electron beam method is also introduced (on pages 828–829 in the ELECTRONICS LETTERS 9th May 1991, Vol. 27, No. 10) wherein it was reported that deep polarization inverted areas were successfully formed to penetrate through an almost 1 mm thick crystal.

With a quasi-phase-matching-type SHG element, it has been theoretically proved that the efficiency of SHG light generation depends on the cross-sectional shape of the polarization inverted areas and if the cross section is made in a rectangular shape, the efficiency of conversion to a second harmonic can be raised by 4 times or more as compared with that by a triangular shape cross section and, furthermore, the positional accuracy of the polarization converted layers becomes less critical (on pages 1–6 in the Intern. Conf. on Materials for Non-Linear and Electrooptics, Jul. 4–7, 1989).

Nevertheless, with the cross sectional shape of polarization inverted grids formed through the Ti diffusion method using an LN substrate of triangular shape as shown in FIG. 2 as numeral 31 and that of polarization inverted grids formed through the proton exchange method of semi-circular shape as shown in FIG. 3 as numeral 41, SHG light has not yet been generated with an efficiency near that of an SHG element with polarization inverted grids of an ideal rectangular cross-sectional shape.

Also, in Ti diffusion areas, more optical damage tends to occur wherewith the index of refraction changes by strong light and in the proton exchange areas, the non-linear optical coefficient deteriorates making it difficult to exhibit the innate efficiency of SHG generation.

Furthermore, the proton exchange treatment method previously employed includes, as shown in FIG. 9, storing the proton source acid 353 inside a glass container 351 installed in a constant temperature bath 354, a substrate 352 being dipped into said acid 353. In this case, however, the glass container 351 tends to be corroded by the proton source acid and the surface of the substrate tends to become coarse or even cracked by the difference in the crystal orientation, since proton exchange is made in all directions in the substrate, thereby opposing the chemically damaging orientation of the acid. Furthermore, in the conventional method, the formation of polarization inverted grids and production of the light wave guide must be processed separately, thus requiring photo-lithography to be performed two or more times.

With the SHG element as presented in the Applied Physical Letters, the depth of polarization inverted grids is very shallow at 1.6 microns while the width is at 2.1 microns and not particularly suitable as a large output element and heat treatment requisition also is very high at 550° C. The reason for there being a restriction in the depth with such an SHG element is because the diffusion proceeds isotropically and in order to form periodical polarization inverted grids, said diffusion must be confined to a certain extent as otherwise said grids: merge with adjoining grids thus impeding the formation of polarization inverted grids.

With the method employing an electron beam to form polarization inverted areas, since grids are pictured successively by electron beam, the depth and width of the polarization inverted grids in the direction perpendicular to the optical axis intrinsically become uneven, making it difficult to maintain uniformity and to generate SHG light satisfactorily. Also, in this method, it is difficult to form polarization inverted areas of larger size because of the occurrence of electron charge up.

SUMMARY OF THE INVENTION

This invention, thus, aims at achieving a new production method of an SHG element which is capable of uniformly forming polarization inverted grids of ideal rectangular cross-section and with sufficient depth and at supplying high output and high efficiency SHG elements produced by said production method.

As a result of detailed study into the formation processes of polarization inverted grids, the inventor of this invention discovered that deeper polarization inverted areas appear when the substrate undergoes a comparatively rapid heat history. This is because the extent of polarization changes sharply corresponding to the rapid temperature variation, leading to the generation of an effective electric field near the domain wall and, consequently, it is thought that domains having acute-angled ends or which are spike-shaped grow from the sprout-area of polarization inversion as the starting point along the c-axis, being the direction of polarization inversion.

Here, the sprout-area of polarization inversion is an area wherein the extent or direction of polarization inversion are locally different from surrounding portions and, for example, the composition modulated area becomes the sprout area of polarization inversion.

Meanwhile, it is also thought in the present invention that similar growth phenomenon may also be caused by stress as well as by temperature variations.

Based on the aforementioned deduction, in order to periodically form polarization inverted grids having acute angled ends on the surface of an LT or LN substrate, after or at the same time as periodically forming sprout areas of polarization inversion on the substrate surface, polarization inverted areas with acute angled top ends were formed through the application of thermal gradient under an appropriate temperature increase/decrease rate before, or simultaneously, producing a light wave guide in the direction perpendicular to said areas, thus forming polarization inverted grids of rectangular shape, practically in the light wave guide, resulting in the realization of a high output and high efficiency SHG element.

The present invention primarily intends to provide a new production method of an SHG element which is capable of forming deep and uniform polarization inverted grids providing an ideal rectangular cross-section. Said production method of an SHG element of this invention consists of the periodic formation of sprout areas of polarization inversion on a substrate and, simultaneously, or followed by, extension of the polarization inverted areas with the top end thereof made into an acute angle from said sprout area of polarization inversion, to form polarization inverted grids among sprout areas of polarization inversion and polarization inverted areas wherein the depth/width ratio of said polarization inverted grids is greater than 1.

With the method of the present invention, in order to periodically form polarization inverted areas in a uniform composition region on an LT or LN substrate, polarization inverted areas having acute-angled top ends are periodically formed by applying a heat history under an appropriate temperature increase/decrease rate when periodical grid patterns are formed by proton exchange to form periodical polarization inverted areas featuring acute-angled top ends before producing a light wave guide, such light wave guide also able to be produced after application of heat treatment, thus practically forming rectangular shaped polarization inverted grids in! said light wave guide.

The method of proton exchange treatment of the present invention consists of maintaining acid (a single type or a mixture of two or more types out of pyrophosphoric acid, phosphoric acid, benzoic acid and stearic acid) as the proton exchange source on the surface of a substrate, taking advantage of its surface tension as shown in FIG. 11, and applying proton exchange only on a single surface of the crystal substrate by applying abrupt heat history by means of a directional heating method such as with a plate-type heater 64, thus successfully forming periodical polarization inverted areas with their top ends at an acute angle. It is advisable to use platinum as the material for the substrate holder 62 having superior heat conductivity and being less corrosive to the proton source acids and to form it in a plate shape or, for protection of the heater in case acid spills from the holder, in a dish shape. Meanwhile, it should be evident to those in the industry that ion exchange may also be used for the same purpose as well as proton exchange.

The production method of the SHG element of the present invention consists of forming sprout areas of polarization inversion through the application of proton exchange treatment liquid or ion exchange treatment liquid on a substrate and extending the polarity inverted areas from said sprout areas of polarization inversion to produce the SHG element, the production method of which is such that said proton exchange treatment liquid or ion exchange treatment liquid are applied to the surface of said substrate using the surface tension of such liquid.

This invention, further, relates to a production method of a SHG element provided with sprout areas of polarization inversion formed by the application of proton exchange treatment liquid or ion exchange treatment liquid on the surface of a substrate and featuring polarization inverted areas extending from said sprout areas of polarization inversion and wherein said production method is characterized by the simultaneous formation of said sprout areas of polarization inversion and said polarization inverted areas by the heating of said substrate from one of its surfaces with said proton exchange treatment liquid or ion exchange treatment liquid applied thereon.

It is also effective to allow the polarization inverted areas with acute-angled top ends grow at the same time as the formation of the sprout areas of polarization inversion when making proton exchange. Another option is to apply heat treatment after the proton exchange.

With the production method of the present invention, when applying heat treatment after proton exchange, it is advisable to select a heat treatment temperature of 200° C. or more, advisably under 600° C., or preferably under 300° C. The heat treatment time should advisably be 20 minutes or less, 10 minutes or less being preferable. This is because the nature of the polarization inverted areas may change or they may disappear if the upper limit is exceeded.

Also, it is advisable to adopt a temperature variation rate of 50° C./min. or more to either or both of the temperature increase process up to the heat treatment point and/or temperature decrease process from the heat treatment temperature.

As aforementioned, the production method of this invention is a new method for the production of a SHG element wherewith uniform and deep polarization inverted areas can be extended from the sprout areas of polarization inversion by the application of rapid heat variation at a comparatively low temperature range.

Furthermore, the production method of the SHG element of the present invention is unique in its method of applying proton exchange treatment liquid or ion exchange treatment liquid to only a single surface of a substrate, taking advantage of the surface tension of said liquid, rather than dipping the substrate into a treatment liquid bath such as in the conventional method and is also unique in that it is preferable to use a directional heating measure to heat from a single side such as by use of a plate type-heater, although an electric furnace would also be acceptable, as the heating method when making proton exchange.

Also, in the production method of the present invention, the sprout areas of polarization inversion may be removed or the polarization inverted grids and light wave guide may be formed simultaneously. With the latter choice especially, since the production can be completed in a single process, not only can the production process be simplified, but also deterioration of polarization inverted areas by re-heating may be prevented.

Furthermore, the production method of this invention enables the production of a new type of SHG element provided with uniform and ideally deep rectangular cross sections of those areas which the conventional methods are unable to provide.

In other words, the SHG element of this invention is a second harmonic generating element provided with sprout areas of polarization inversion periodically formed on a substrate and with polarization inverted areas featuring acute-angled top ends extending from said sprout areas of polarization inversion, the depth/width rate of the polarization inverted grids being formed by said sprout areas of polarization inversion and said polarization inverted areas exceeding 1.

With the SHG elements of conventional production methods, the depth/width ratio of polarization inverted grids has thus been insufficient at less than 1 but with the SHG element of the present invention, the ratio exceeds 1 and it can thus satisfy requirements for a high efficiency SHG element through its rectangular area cross-section. Furthermore, for a so-called bulk-type SHG element, wherewith fundamental wave is injected all over the substrate rather than forming a light wave guide, uniform and deep polarization inverted grids of the SHG element of the present invention are more suitable.

Also, the SHG element of this invention is a second harmonic generating element wherewith the polarization inverted grids and light wave guide are produced in a single process thus forming periodical polarization inverted grids and a light wave guide on the substrate, the width perpendicular to the optical axis of said polarization inverted grids being the same as the width of said light wave guide.

Furthermore, with the SHG element formed by the production method of this invention, said sprout areas of polarization inversion may be removed when necessary. The production method of this invention can also provide a second harmonic generating element provided with polarization inverted grids with the top ends at an acute angle periodically formed on a substrate together with a light wave guide wherein said polarization inverted grids are characterized by a depth/width ratio exceeding 1.

As a result of continued research aiming at further improvement of the SHG output, the inventor of the present invention has been able to achieve the following inventions for improvement.

Firstly, by the adoption of the SHG element of this invention, with its substrate containing 1 mole percent or more of MgO, photo-deterioration by photo-refractive effect has been reduced resulting in enhancement of the SHG output. Also, the addition of MgO improves light transmittance in the 280–400 nm band and supposedly also contributes to the enhancement of the SHG output. Meanwhile, although the effect of adding MgO increases in proportion to the amount added, it is advisable to keep the amount at 15 mole % or less since otherwise it becomes difficult to produce monocrystals.

In this case, LT substrates are more effective but a similar effect can be achieved by the addition of MgO to LN substrates.

Secondly, it was discovered that the SHG output could be increased by lessening photo-deterioration by heating the substrate up to 50° C. or more. Well-known heating measures such as the Peltier element, a heater and a constant temperature bath can be used for this purpose.

DETAILED DESCRIPTION OF THE PREFERRED EMBODIMENTS

Referring more particularly to the exemplary embodiments of the present invention according to the drawings:

(Embodiment 1)

Figure 1:
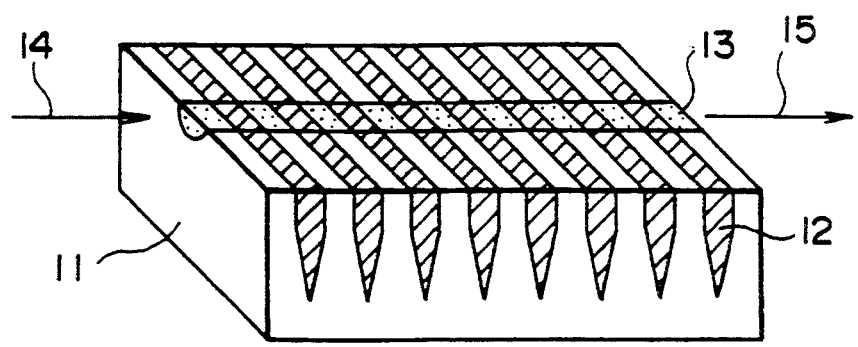
FIG. 1 is an explanatory structural drawing of an embodiment of the present invention.
Figure 2:
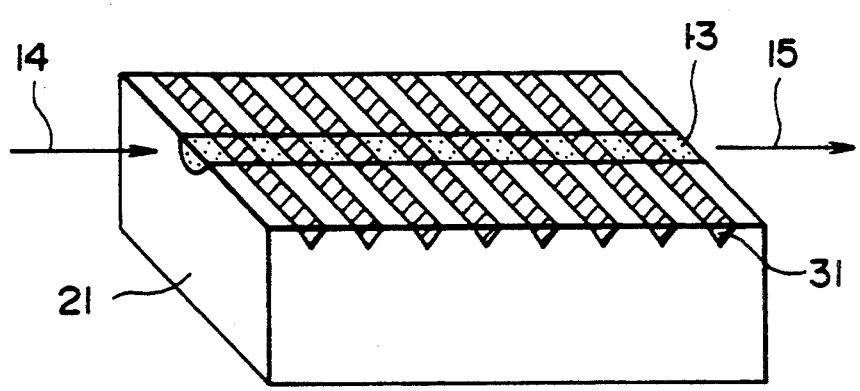
FIG. 2 is a drawing indicating a conventional SHG element using triangular shape polarization inverted grids.
Figure 3:
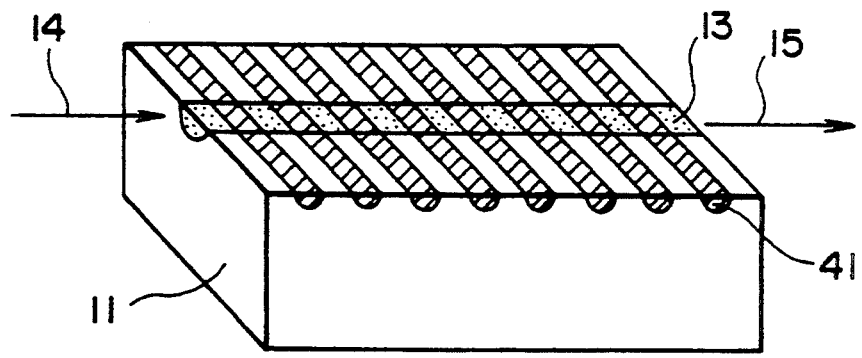
FIG. 3 is a drawing indicating a conventional SHG element using semi-circular shape polarization inverted grids.
Figure 4A:
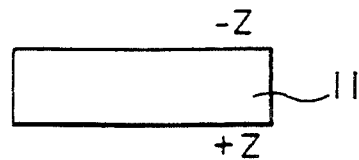
FIG. 4 consists of explanatory sketches (a) through (h) indicating the fabricating process of producing the polarization inverted grids of the present invention.
Figure 4B:
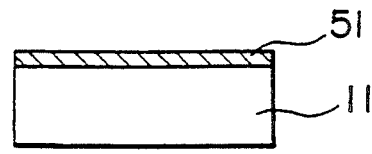
Figure 4C:
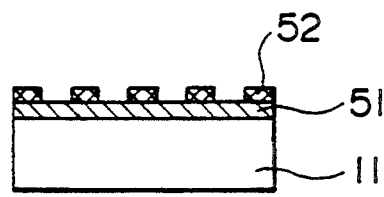
Figure 4D:
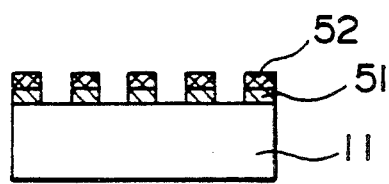
Figure 4E:
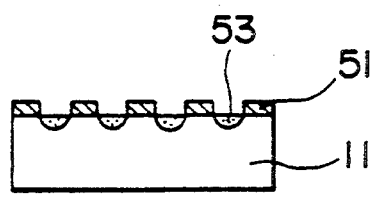
Figure 4F:
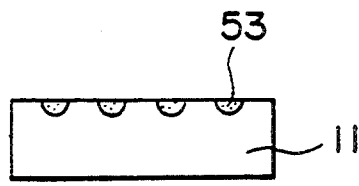
Figure 4G:
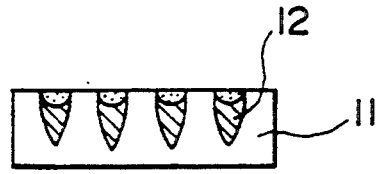
Figure 4H:
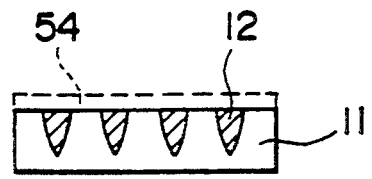

FIG. 1 is an explanatory structural and operational drawing showing an embodiment of an SHG element of the present invention wherein 11 is a LT monocrystal substrate with its −Z surface as the upper surface and with its spontaneous polarization directed downward. Numeral 12 is the section where the polarization is inverted with an acute-angled top end wherein the direction of polarization in this section is upward. Numeral 13 is a channeled light wave guide through which the fundamental wave and SHG light are transmitted.

Numeral 14 is the incident fundamental wave and is polarized in the direction vertical to the crystal surface. Numeral 15 is SHG light generated in the light wave guide section and is also polarized in the direction vertical to the crystal surface. Arrows 14 and 15 indicate the optical axes.

Referring more particularly to an embodiment of a method of forming the polarization inverted grids of the present invention according to FIG. 4, the preparation of an LT substrate 11 having its −Z (c) surface polished to an extent of 1/10 of the wave length λ of the laser beam being used, as shown in explanatory sketch (a) in FIG. 4. As shown in sketch (b) in FIG. 4, a Ta-film 51 with thickness of 30 nm is built up on the −Z surface of the substrate 11 by means of sputtering.

As indicated in sketch (c) in FIG. 4, photoresists 52 were spin-coated over the Ta-film 51 and, using a photo-mask with the sections for polarization inversion 12 opened. Patterning of the photoresists was carried out by means of photo-lithography. The period of the pattern of the photo-mask was in a range of 1-10 microns and matched the wave length of the SHG light being generated. As shown in sketch (d) in FIG. 4, through the masking of patterned photoresists 52, patterning of Ta-film 51 was performed by means of dry etching by RIE using $CF_3CL$ gas or wet etching. As shown in sketch (e) in FIG. 4, after removing the photoresists 52 using acetone, sprout areas 53 of polarization inversion were formed through proton exchange using pyrophosphoric acid at 260° C. for 30 minutes.

The Ta-film 51 was then etched by use of an NaOH aqueous solution as shown in sketch (f) in FIG. 4. After that, as shown in sketch (g) in FIG. 4, the substrate whereon said sprout areas 53 of polarization inversion were formed was heat treated in an electric furnace thus causing polarization inverted areas 12 to extend from the sprout areas 53 of polarization inversion downward to form polarization inverted areas 12 with their top ends at an acute angle. Said heat treatment was carried out at 440° C. for a holding time of 30 seconds and with a temperature rise rate of 50° C./min. up to the heat treatment temperature.

Figure 5:
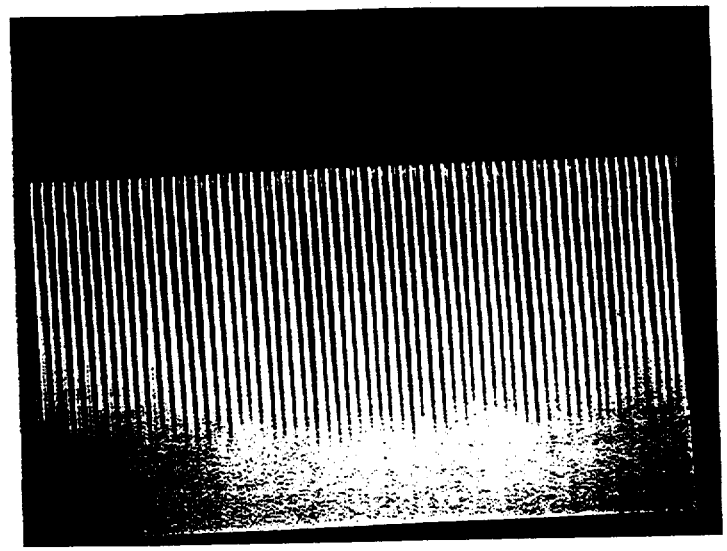
FIG. 5 is a photograph showing the structure of one type of the polarization inverted grids of this invention.

FIG. 5 shows a photograph of the polarization inverted grids thus obtained. The cycle of the polarization inverted grids was 3 microns and, while the depth of the sprout areas of polarization inversion was 1 micron or less, that of the polarization inverted grids exceeded 40 microns, but less than the thickness of the substrate.

Then, a light wave guide was formed to complete a SHG element having an element length of 1 cm. Using a titanium sapphire laser as the fundamental wave source, a fundamental wave with a wave length of 830 nm projected into the SHG element thus produced, generated blue SHG light with a wave length of 415 nm. The output of SHG light at this time was 2.8 mW and the normalized SHG efficiency was $85\%/W.cm^2$. Furthermore in this embodiment, other type of process was tested to produce the light wave guide on the surface of the substrate perpendicular to the polarization inverted grids by means of ordinary proton exchange treatment, following removal of the sprout areas of polarization inversion on the surface of the substrate by polishing, as shown in sketch (h) in FIG. 4, after formation of polarization inverted areas 12 with top ends at an acute angle. The light wave guide was then formed in the direction perpendicular to the polarization inverted grids through the similar process shown in FIG. 4(a)-(f), before finishing the end face of the light wave guide route by optical polishing, to produce an SHG element. Evaluation of the SHG element thus obtained resulted in the same level of output as in the aforementioned case.

Then, for comparison, a similar SHG element was produced by use of the aforementioned conventional technique (ref. pages 2732-2734 in Appl. Phys. Lett. 1991). The cross section of the polarization inverted grids thus produced was of a semi-circular shape. The SHG light output similarly measured was 0.1 mW and the normalized SHG efficiency was $4\%/W.cm^2$, demonstrating that the SHG element of this invention is capable of increasing the SHG light output.

(Embodiment 2)

Figure 6:
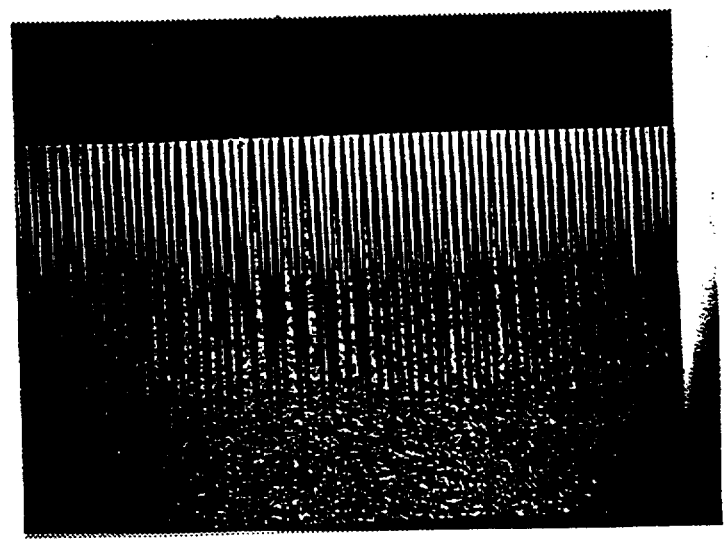
FIG. 6 is a photograph showing the structure of another type of the polarization inverted grids of this invention.

FIG. 6 is a microphotograph of polarization inverted grids obtained on an LN monocrystal substrate through proton exchange at 230° C. for 16 minutes using pyrophosphoric acid, in the same procedures as of embodiment 1, followed by heat treatment at 600° C. for 30 seconds. This embodiment proves that the use of an LN monocrystal substrate also provides deep polarization inverted grids.

(Embodiment 3)

Figure 7:
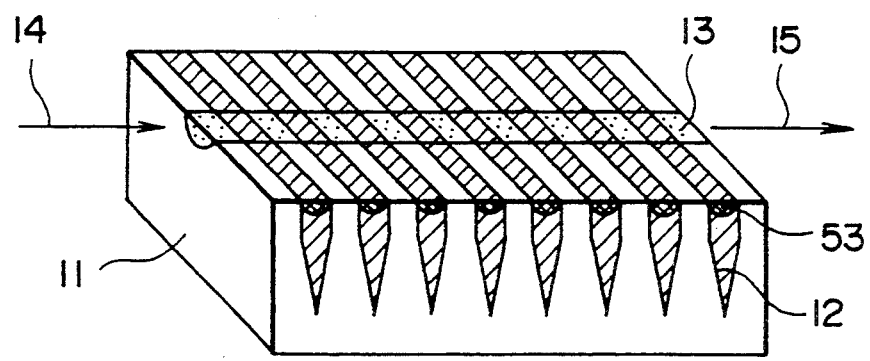
FIG. 7 is an explanatory structural drawing of another embodiment of the present invention.
Figure 8A:
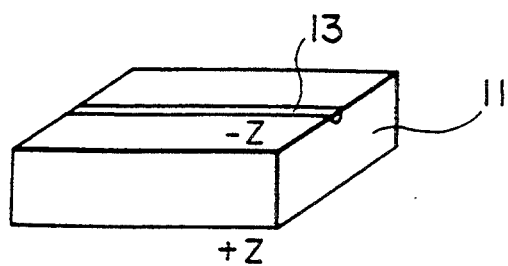
FIG. 8 consists of explanatory sketches (a) through (g) indicating other fabricating process of producing the polarization inverted grids of this invention.
Figure 8B:
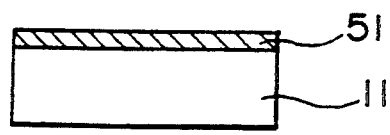
Figure 8C:
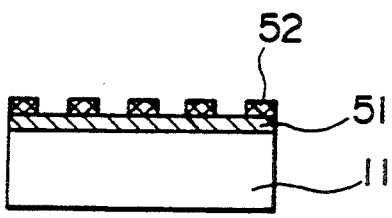
Figure 8D:
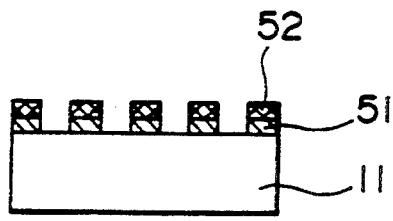
Figure 8E:
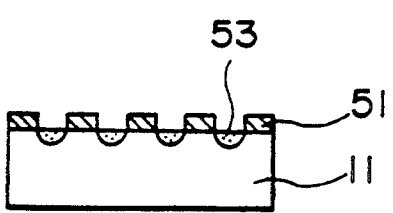
Figure 8F:
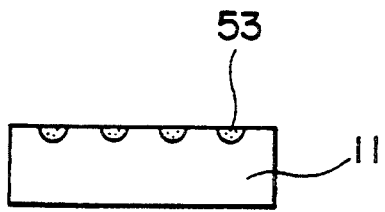
Figure 8G:
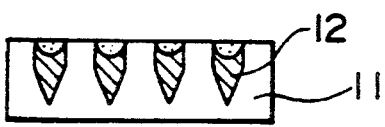
Figure 9:
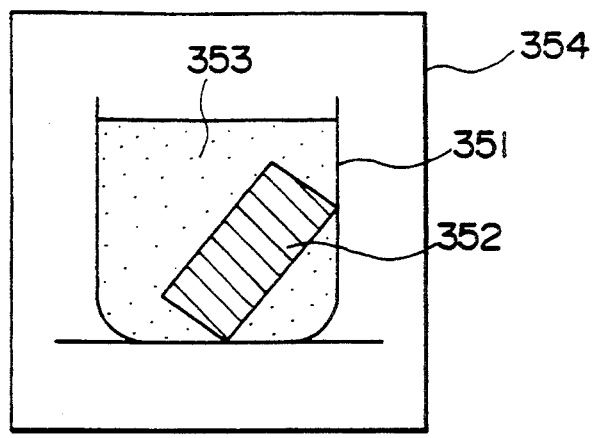
FIG. 9 is an explanatory sketch indicating a conventional method of proton exchange.

In the aforementioned embodiments, the light wave guide was formed after formation of the polarization inverted areas. Their formation sequence can be reversed and, also, as shown in FIG. 7, the sprout areas of polarization inversion 53 may be left as they are.

Referring then to an alternative method of forming polarization inverted grids of this invention according to FIG. 8, an LT substrate 11 was prepared on which a light wave guide route 13 is formed by proton exchange on its −Z (c) surface. Except for the fact that the light wave guide route 13 is formed first, the processes indicated by sketches (b) through (g) in FIG. 8 are the same as those in FIG. 4, (b) through (g), of embodiment 1. The depth of polarization inverted areas 12 thus produced was found to be greater than that of the light wave guide and the depth of the sprout areas of polarization inversion formed on the surface of the substrate. The width of the polarization inverted area 12 was about the same as that of the proton exchange pattern and, polarization inverted grids of a rectangular shape were obtainable within the range of the depth of the light wave guide. Finally, the end face of the light wave guide was optically polished to complete an SHG element as shown in FIG. 5 which gave an SHG light output of 2.7 mW.

(Embodiment 4)

Although proton exchange and the formation of polarization inverted grids in a spike shape were executed in two different processes with the aforementioned two embodiments, these processes may be carried out simultaneously as explained below.

Referring now to the 4th embodiment of this invention, firstly, an explanation on the proton exchange treatment is given below.

Figure 10:
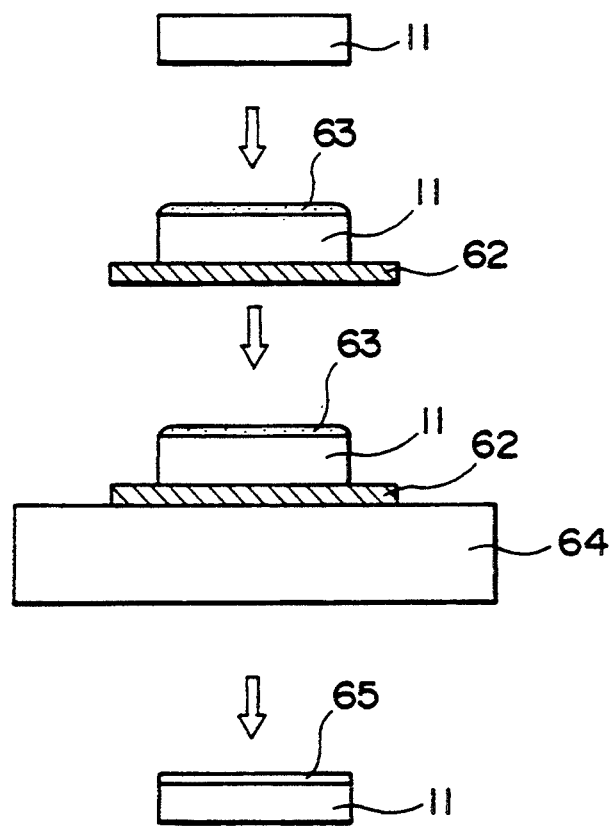
FIG. 10 consists of explanatory sketches indicating the method of proton exchange of the present invention.
Figure 11A:
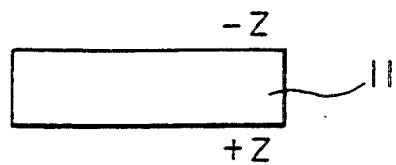
FIG. 11 consists of explanatory sketches (a) through (f) indicating other different methods of producing the polarization inverted grids of this invention.
Figure 11B:
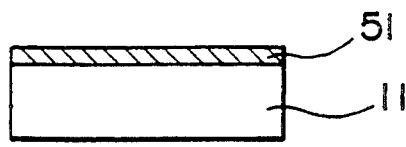
Figure 11C:
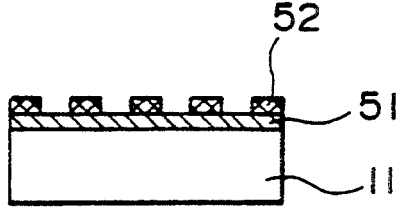
Figure 11D:
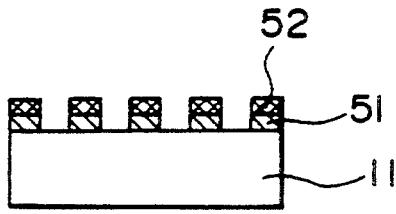
Figure 11E:
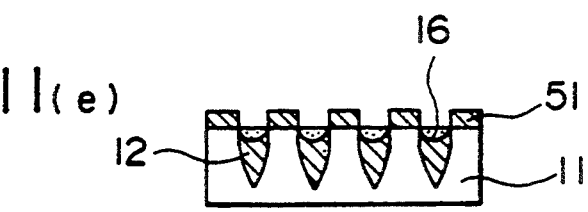
Figure 11F:
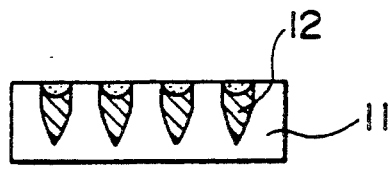

Through the proton exchange treatment wherein substrates are dipped into acidic solution of such acids as pyrophosphoric acid, phosphoric acid, benzoic acid and stearic acid, $H^+$ ions enter the substrate to be exchanged with Li in the substrate to form a layer of changed composition. With the phosphoric acid group, the dissociation constant is higher by two to three digits than that of benzoic acid ($C_6H_5COOH$ with fusing point at 121° C. and boiling point at 250° C.) resulting in higher H concentration, thus tending to make more composition changes. High temperature treatment in liquid at up to 300° C. is possible with them and since the evaporation amount is very minimal, they excel in ease of control and handling. Furthermore, since they are water soluble, the washing of samples, jigs and their containers is easier. As the phosphoric acid, pyrophosphoric acid ($H_4P_2O_7$ with a fusing point of 61° C. and boiling point of 300° C.) was used. As FIG. 10 shows, an LT monocrystal substrate 11 with its $-Z$ surface facing upwards was placed on a platinum plate 62, as the substrate holder, and a few drops of pyrophosphoric acid 63 were dropped onto the surface of the substrate and maintained by its own surface tension. Then, the substrate holder 62 was placed on a directional heating measure such as a plate heater 64 to heat it from a single direction, namely, from the rear surface side for several minutes to several hours to execute proton exchange. Here, a directional heating measure means a heating method which enables the heating of a substrate from its single side. On completion of proton exchange, the substrate was taken out for washing in water to remove pyrophosphoric acid 63. Thus, the proton exchanged layer 65 is formed on only one side of the substrate 11. Proton exchange, meanwhile, was executed under an atmospheric environment. In order to make proton exchange selectively, Ta-film which is not soluble in pyrophosphoric acid is deposited on the surface of the substrate to make a masking grid by photo-lithography before executing proton exchange. As the material for the substrate holder 62, platinum was employed here, having a higher heat conductivity and less corrosiveness to the proton source acid, being made into a dish-shape for protection of the heater in the event of acid spilling out.

Referring next to the method of forming the polarization inverted grids of this invention according to FIG. 11, a LT substrate 11 was prepared as shown in sketch (a) in FIG. 11. The processes shown as sketches (b) through (d) in FIG. 11 are identical to the processes shown as sketches (b) through (d) in FIG. 4 of the embodiment 1. Then, as shown in sketch (e) In FIG. 11, photoresists 72 were removed by acetone before executing proton exchange heat treatment using pyrophosphoric acid at 260° C. for 30 minutes as shown in FIG. 10 to form sprout areas 16 of polarization inversion and, at the same time, to form polarization inverted areas 12 with top ends at an acute angle.

Meanwhile, when the substrate holder 62 is placed on and taken off the heater 64, the substrate 11 is subjected to abrupt heat variation.

The temperature increase rate up to the proton exchange treatment point should be at 50° C./min. or quicker and the temperature decrease rate from the heat treatment point should be 50° C./min. or quicker.

Then, Ta-film 51 was etched using an aqueous solution of NaOH as shown in sketch (f) in FIG. 11. After that, a light wave guide was produced. The depth of polarization inverted grids thus produced was greater than that of the light wave guide provided on the surface of the substrate but less than the substrate thickness. Their width was about the same as that of the proton exchange pattern and rectangular shape polarization inverted grids of rectangular shape were obtainable within the range of the depth of the light wave guide. Finally, the end face of the light wave guide route was optically polished to complete an SHG element.

In this embodiment, the formation of the polarization inverted grids 12 could be executed simultaneously with proton exchange thus eliminating the need for additional heat treatment and thereby lessening the number of processes. Also, since heating was carried out from a single direction, namely from the rear surface of the substrate, for proton exchange, the heat dispersion direction could be controlled more easily, as compared with the case of overall heating in a heating furnace, to form superior polarization inverted grids.

Producing polarization inverted grids by the said method, an SHG element with an element length of 1cm was achieved. Using the same titanium sapphire laser as that used in embodiment 1 as the fundamental wave, incidence of the fundamental wave resulted in similar SHG light output and normalized SHG efficiency as with embodiment 1.

(Embodiment 5)

In the aforementioned embodiment 3, separate processes were used for the formation of polarization inverted grids and of the light wave guide. Nevertheless, all these formations may also be executed under single photo-lithography as described below.

Figure 12:
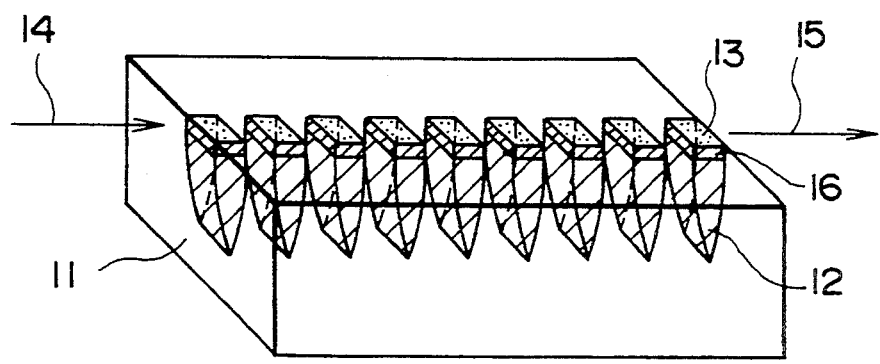
FIG. 12 is an explanatory structural drawing of an embodiment of the present invention.
Figure 13A:
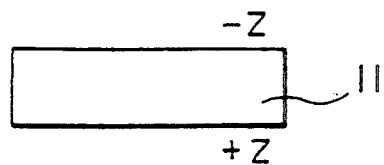
FIG. 13 consists of explanatory sketches (a) through (f) indicating other different methods of producing the polarization inverted grids and light wave guide of this invention.
Figure 13B:
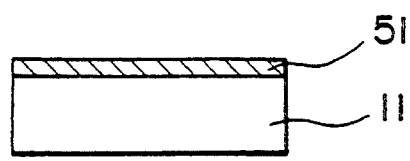
Figure 13C:
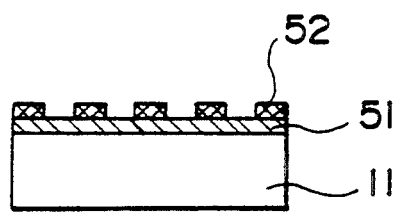
Figure 13D:
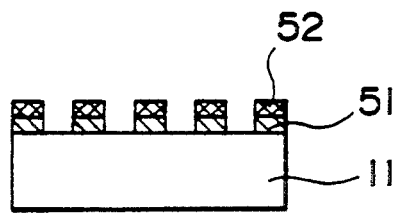
Figure 13E:
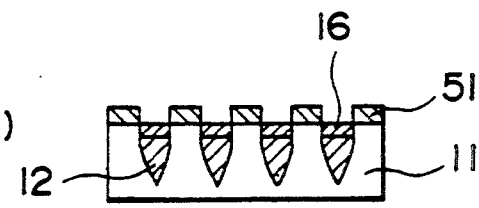
Figure 13F:
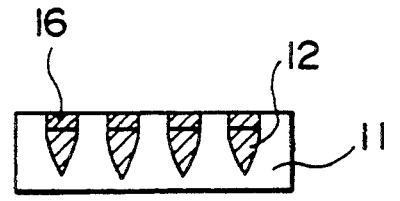

In FIG. 12, 11 is an LT monocrystal substrate with its $-Z$ surface facing upwards and the direction of spontaneous polarization downwards. Numeral 12 is a polarization inverted area simultaneously formed with the sprout area 16 of polarization inversion, or area of changed composition by proton exchange.

Referring next to the method of forming the polarization inverted grids and the light wave guide of the present invention according to FIG. 13, the sketches indicate cross sections of the light wave guide and polarization inverted grids. An LT substrate 11 was prepared as shown in sketch (a) in FIG. 13.

All the processes shown in sketches (b) through (d) of FIG. 13 are identical to those shown in sketches (b) through (d) in FIG. 4 of the aforementioned embodiment 1, except for the use of photomasking provided with an opening for the light wave guide with the width of 2-6 microns in the process shown as sketch (c) in FIG. 13. As shown in sketch (e) in FIG. 13, photoresist 72 was removed using acetone before executing proton exchange heat treatment using pyrophosphoric acid as shown in FIG. 10 at 260° C. for 30 minutes to form sprout areas 16 of polarization inversion and, at the same time, to produce polarization inverted areas 12.

When the substrate holder 62 was placed on and taken off the heater 64 in FIG. 10, the substrate 11 underwent abrupt heat variation. The temperature increase rate at this time up to the proton exchange treatment point should be at 50° C./min. or quicker and the temperature decrease rate from the heat treatment point should be at 50° C./min. or quicker thus providing the polarization inverted areas 12 which were extended from the sprout areas 16 of polarization inversion. As shown in sketch (f) in FIG. 13, Ta-film 51 was then etched using an aqueous solution of NaOH. Heat treatment at 380° C. for a treatment time of 5 minutes with a temperature increase rate up to the heat treatment point at 50° C./min. or quicker and with a temperature decrease rate from the heat treatment point at 50° C./min.

or faster increased the refractive index at the proton exchanged section thus forming a light wave guide, and cured deterioration by the protons of non-linear optical constant.

However, if the heat treatment was performed for more than 20 minutes, excessive proton diffusion occurs to increase the loss in the light wave guide. The depth of the polarization inverted grids thus produced was greater than that of the light wave guide, namely the proton exchanged layer formed on the surface of the substrate, but was less than the thickness of the substrate, the width thereof being about the same as that of the proton exchange pattern. Rectangular-shape polarization inverted grids were thus obtainable within the range of the depth of the light wave guide. Finally, the end face of the light wave guide was optically polished to complete a SHG element which exhibited a light output of the same level as that of the SHG element of embodiment 1.

(Embodiment 6)

Table 1 shows the results of evaluation as being similar to those with embodiment 1 by changing the temperature of the substrate from room temperature to 85° C. using an SHG element obtained in embodiment 1.

TABLE 1

| Substrate temperature (°C.) | SHG light output (mW) |
|---|---|
| 25 | 2.8 |
| 30 | 3.1 |
| 40 | 5.2 |
| 50 | 9 |
| 60 | 14 |
| 70 | 20 |
| 80 | 22 |
| 85 | 24 |

The results in Table 1 demonstrate that the SHG light output was increased by maintaining the substrate temperature at 50° C. or over, preferably at 70° C. or over, indicating that photo-deterioration was reduced by the temperature rise.

(Embodiment 7)

The inventor of this invention discovered that the SHG light output could also be enhanced by having the LT substrate contain 1 mole % or more of MgO.

Preparing an LT substrate containing 1 mole % of MgO, a SHG element was produced under the same processes as of the exemplary embodiment 1.

Incidenting a fundamental wave with a wave length of 820 nm into the SHG element thus produced, provided a blue SHG of 410 nm. At this time, with the cross section of the polarization inverted grids being of rectangular shape and the depth of the polarization inverted areas being greater than the width in the periodic direction, a high output SHG light at 15 mW was obtained and stable output was available at a power density of 165 KW/cm². Furthermore, by changing the period of polarization inverted grids and using semiconductor laser with a wave length of 780 nm as the fundamental wave, SHG light outputs were evaluated with an element provided with a substrate of LT monocrystal containing MgO, and with improved light transmittance in the wave length range of 280–400 nm, resulting in a SHG light output of about 1.5 mW.

(Embodiment 8)

Figure 14:
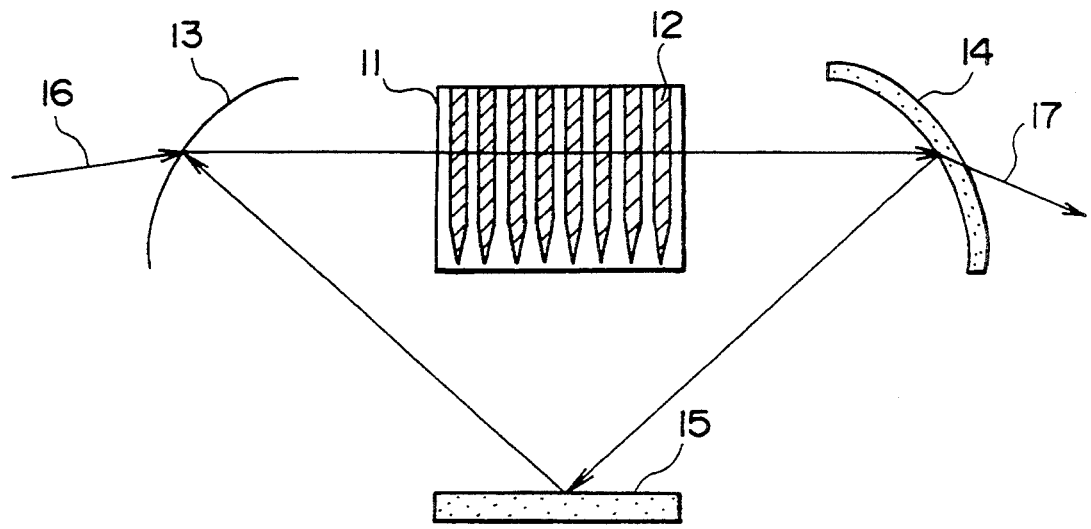
FIG. 14 is a structural drawing of an embodiment using a ring resonator.

Using the second harmonic generating element produced under the aforementioned embodiment 1, a ring resonator as shown in FIG. 14 was constructed. In this structure, the inner surface of the resonator mirror 13 was such that 98% of the fundamental wave 16 could be reflected with only 2% entering the resonator. The incident light entering the resonator forms a ring resonator consisting of the resonator mirror 14 which reflects the fundamental wave and transmits SHG light and the total reflection mirror 15. Numeral 16 is the incident fundamental wave and is polarized in the direction vertical to the crystal surface while 17 is SHG light generated inside the crystal which passes through the mirror 14 and is polarized in the direction vertical to the crystal surface.

(Embodiment 9)

Figure 15:
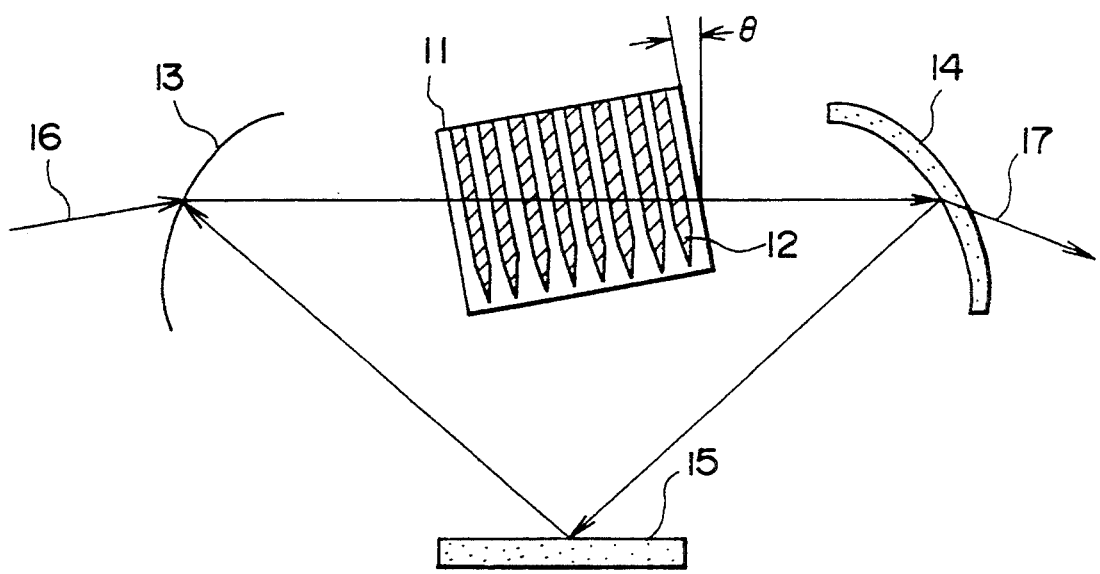
FIG. 15 is a structural drawing of another embodiment using a ring resonator.
Figure 16:
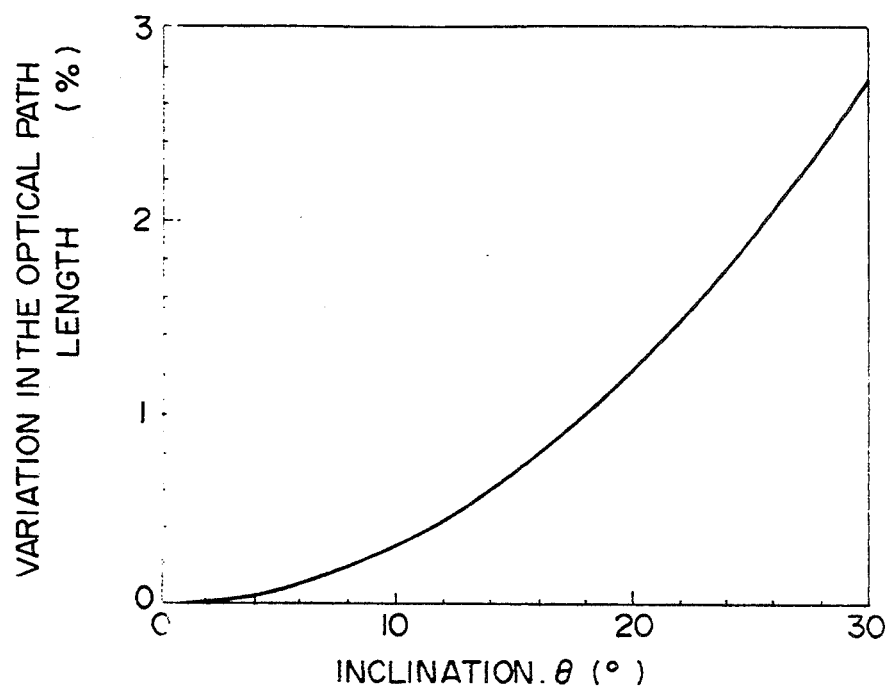
FIG. 16 is a drawing indicating a variation of an optical path length due to the inclination of an LiTaO$_3$ crystal.
Figure 17:
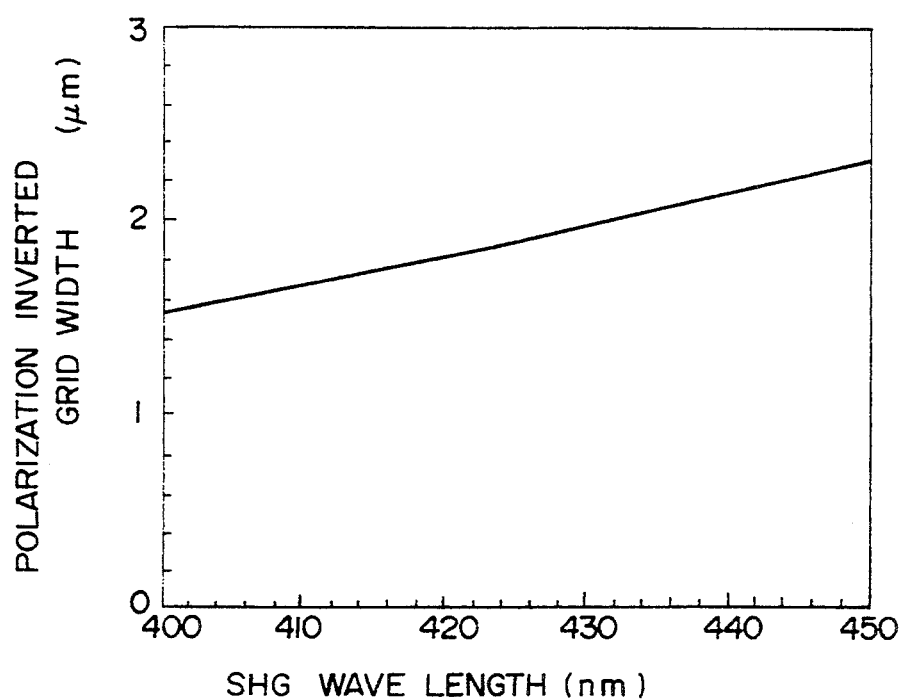
FIG. 17 is a drawing indicating the relationship between a polarization inverted grid width and a phase-matching SHG wave length.

With the ring resonator constructed under embodiment 8, the second harmonic generating element was inclined to the optical axis. FIG. 15 shows the structure in this case. The length of the optical path inside the crystal varies depending on the inclination $\theta$. FIG. 16 shows the variation of the optical path length to, the inclination of $LiTaO_3$ crystal. If the inclination is less than the total reflection angle of 27°, the length of the optical path can be varied up to 2%. From the relation between the polarization inverted grid width and the phase-matching SHG wave length as shown in FIG. 17, the ratio of SHG wave length to the polarization inverted grid width is 0.015 micron/nm, therefore, when the polarization inverted grid width is 1.5 micron, if the optical path length changes by 2%, the phase-matching SHG wave length can be adjusted by about 2 nm. The above indicate is the fact that to compensate for the wave length dispersion of semiconductor laser as the fundamental wave, inclining the substrate allows the wave length to be adjusted.

(Embodiment 10)

Figure 18:
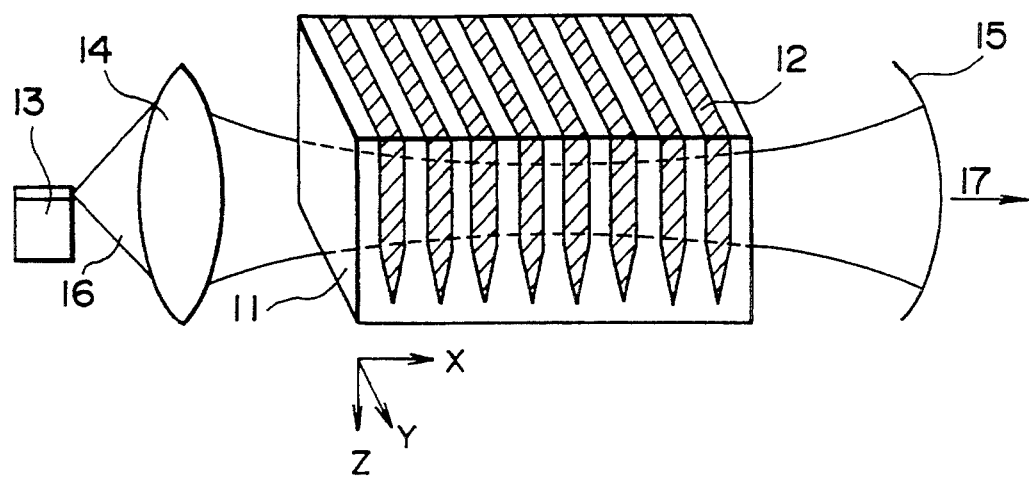
FIG. 18 is a structural drawing of an embodiment using an internal resonator.

The second harmonic generating element produced under the aforementioned embodiment 1 was used as an internal resonator as shown in FIG. 18 wherein 14 represents a lens and 15 indicates a resonator mirror to reflect the fundamental wave, said fundamental wave resonating between the cleaved faces of semiconductor laser 13. Numeral 16 is incident fundamental wave and is polarized in the direction vertical to the crystal surface. Numeral 17 represent SHG light generated inside the crystal which passes through the mirror 15 and is polarized in the direction vertical to the crystal surface. By moving the resonator mirror 15, the wave length of the fundamental wave can be regulated by constructing an external resonator of semiconductor laser.

(Embodiment 11)

Figure 19:
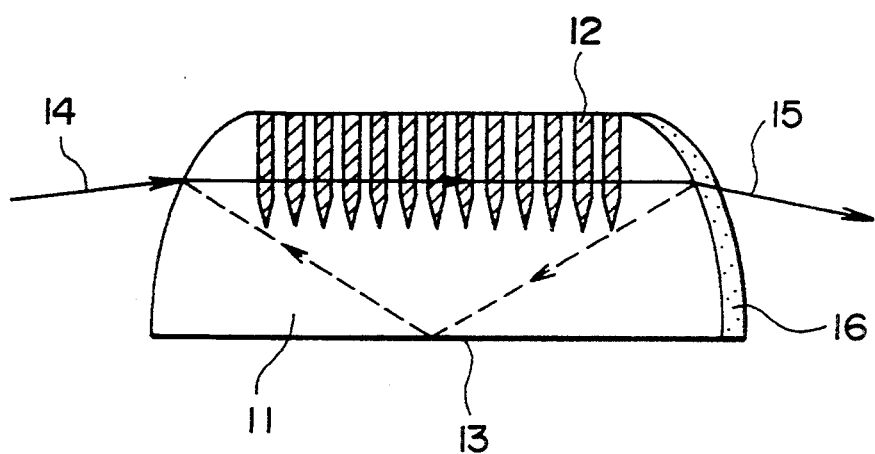
FIG. 19 is a structural drawing of another embodiment using a monolithic ring resonator.

The second harmonic generating element produced under the aforementioned embodiment 1 was employed as a monolithic ring resonator as shown in FIG. 19. In this structure, both ends of the crystal 11 are processed to a parabolic mirror finish wherein when combined with the total reflection at the inner surface 13, it constitutes a monolithic ring resonator. SHG light 15 can be obtained by phase matching in the optical path indicated by the solid line inside the crystal 11. In this construction, the surface of the output mirror 16 is formed of dielectric multilayer structure which reflects the fundamental wave but transmits SHG light. Numeral 14 is the incident fundamental wave which is polarized in the direction vertical to the crystal surface and 15 represents SHG light generated inside the crystal which likewise is polarized in the direction vertical to the crystal surface.

As explained in the above, the production method of this invention exhibits superb operating effects as are presented below.

The production method of the present invention provides polarization inverted areas having acute-angled top ends and, by forming polarization inverted grids with a depth/width ratio exceeding 1, ideal rectangular-shape polarization inverted grids can be obtained, achieving a SHG element which generates SHG light at a high level of efficiency.

The production method of this invention also provides ideal shape of polarization inverted grids through the production of polarization inverted grids extending from the proton exchange areas (sprout areas of polarization inversion), which result in a SHG element capable of generating SHG light at a high level of efficiency.

The production method of this invention can further provide ideal rectangular-shape polarization inverted grids through the production of polarization inverted grids out of the proton exchanged area, and a SHG element capable of generating SHG light at a high level of efficiency.

The production method of this invention can further provide ideal rectangular-shape polarization inverted grids through the production of polarization inverted grids with top ends at an acute angle extending beyond the proton exchanged area and easily provides, through a single photolithographic process, a SHG element capable of generating SHG light at a high level of efficiency.

The production method of this invention can also produce polarization inverted grids which extend beyond the proton exchanged areas, and a light wave guide by a single photo-lithographic process.

Through the production method of this invention, by the addition of MgO, an LT substrate exhibiting superb light transmittance in the shorter wave length range of less than 400 nm can be obtained and also, the SHG light output can be increased by heating the substrate.

The present invention is not limited to the foregoing embodiments but many modifications and variations are possible within the spirit and scope of the appended claims of the invention.

What is claimed is:

1. A second harmonic generating element comprising:
   a substrate;
   sprout areas of polarization inversion periodically formed on said substrate; and
   polarization inverted grids with top ends extending from said sprout areas of polarization inversion, wherein a depth/width ratio of said polarization inverted grids formed of said sprout areas of polarization inversion and said polarization inverted areas exceeds 1.

2. A second harmonic generating element as set forth in claim 1, including a light wave guide on said substrate, wherein said polarization inverted grids in a direction substantially perpendicular to an optical axis have substantially the same width as said light wave guide.

3. A second harmonic generating element as set forth in claim 1, wherein said sprout areas of polarization inversion constitute composition changed areas.

4. A second harmonic generating element as set forth in claim 1, wherein said substrate is made of $LiTaO_3$ or $LiNbO_3$.

5. A second harmonic generating element as set forth in claim 1, wherein said substrate is made of $LiTaO_3$ to which MgO is doped.

6. A second harmonic generating element as set forth in claim 5 wherein said substrate contains 1 mole % or more of MgO.

7. A second harmonic generating element as set forth in claim 1, wherein a heater is provided to heat said substrate up to 50° C. or more.

8. A second harmonic generating element as set forth in claim 1, wherein said second harmonic element comprises a ring resonator positioned to permeate light in a single direction of said second harmonic generating element.

9. A second harmonic generating element as as set forth in claim 1, wherein said second harmonic generating element is inclined within a total reflection angle.

10. A second harmonic generating element as set forth in claim 1, wherein said second harmonic element comprises an internal resonator positioned to permeate light in the X-direction of said second harmonic generating element.

11. A second harmonic generating element as set forth in claim 1, wherein said second harmonic element comprises a monolithic ring resonator, said second harmonic generating element having a pair of spaced ends arranged as mirrors.

12. A second harmonic generating element comprising:
    a substrate;
    polarization inverted grids with top ends, periodically formed on said substrate; and
    a light wave guide on said substrate, wherein a depth/width ratio of said polarization inverted grids exceeds 1.

13. A production method of a second harmonic generating element wherein sprout areas of polarization inversion are periodically formed on a substrate and, simultaneously or later, polarization inverted areas are extended from said sprout areas so as to form a top end of an acute angle, wherein a depth/width ratio of the polarization inverted grids formed of said sprout areas of polarization inversion and said polarization inverted areas exceeds 1.

14. A production method of a second harmonic generating element wherein polarization inverted grids are periodically formed and a light wave guide is produced on a substrate, wherein said polarization inverted grids and said light wave guide are formed simultaneously to provide a width, in the direction perpendicular to an optical axis, of said polarization inverted grids to be substantially the same as that of said light wave guide.

15. A production method of a second harmonic generating element wherein sprout areas of polarization inversion are periodically formed on a substrate and, simultaneously or later, polarization inverted areas are extended from said sprout areas of polarization inversion, wherein the depth/width ratio of said polarization inverted areas is made to exceed 1, before removing said sprout areas of polarization inversion.

16. A production method of a second harmonic generating element wherein sprout areas of polarization inversion are formed by applying either portion exchange treatment liquid or ion exchange treatment liquid onto a substrate and polarization inverted areas extend from said sprout areas of polarization inversion, wherein said second harmonic generating element is characterized by application onto said substrate of said proton exchange treatment liquid or ion exchange treatment liquid, taking advantage of the surface tension of said liquids.

17. A production method of a second harmonic generating element wherein sprout areas of polarization inversion are formed by applying either proton exchange treatment liquid or ion exchange treatment liquid onto a substrate and polarization inverted areas extend from said sprout areas of polarization inversion, wherein said second harmonic generating element is characterized by the simultaneous formation of said sprout areas of polarization inversion and said polarization inverted areas by heating the substrate from a single side of its surfaces, with said proton exchange treatment liquid or ion exchange treatment liquid being applied onto said substrate.

* * * * *

UNITED STATES PATENT AND TRADEMARK OFFICE
CERTIFICATE OF CORRECTION

PATENT NO. : 5,412,502
DATED : May 2, 1995
INVENTOR(S) : Satoshi Makio et al

It is certified that error appears in the above-indentified patent and that said Letters Patent is hereby corrected as shown below:

Title page, [30] line 1, delete [4-34372], and substitute --4-034372--;
    [57] line 2, after "mamely" insert --,--; and
    line 3, delete "," after "firstly".
Sheet 4 of the drawings, consisting of Figs. 11 and 12 should be deleted to be replaced with Sheet 4, consisting of Figs. 5 and 6, as shown on the attached page.

Column 1, line 13, "2. Related Art" should be a line alone.
Column 2, line 37, delete ":".
Column 3, line 50, delete "!".
Column 14, line 18, delete "as" second occurrence.

Signed and Sealed this

Eleventh Day of July, 1995

Attest:

BRUCE LEHMAN

*Attesting Officer*     *Commissioner of Patents and Trademarks*

20μm

50μm